A. E. HALL.
VEHICLE WHEEL.
APPLICATION FILED OCT. 9, 1920.
1,432,690.
Patented Oct. 17, 1922.
2 SHEETS—SHEET 1.
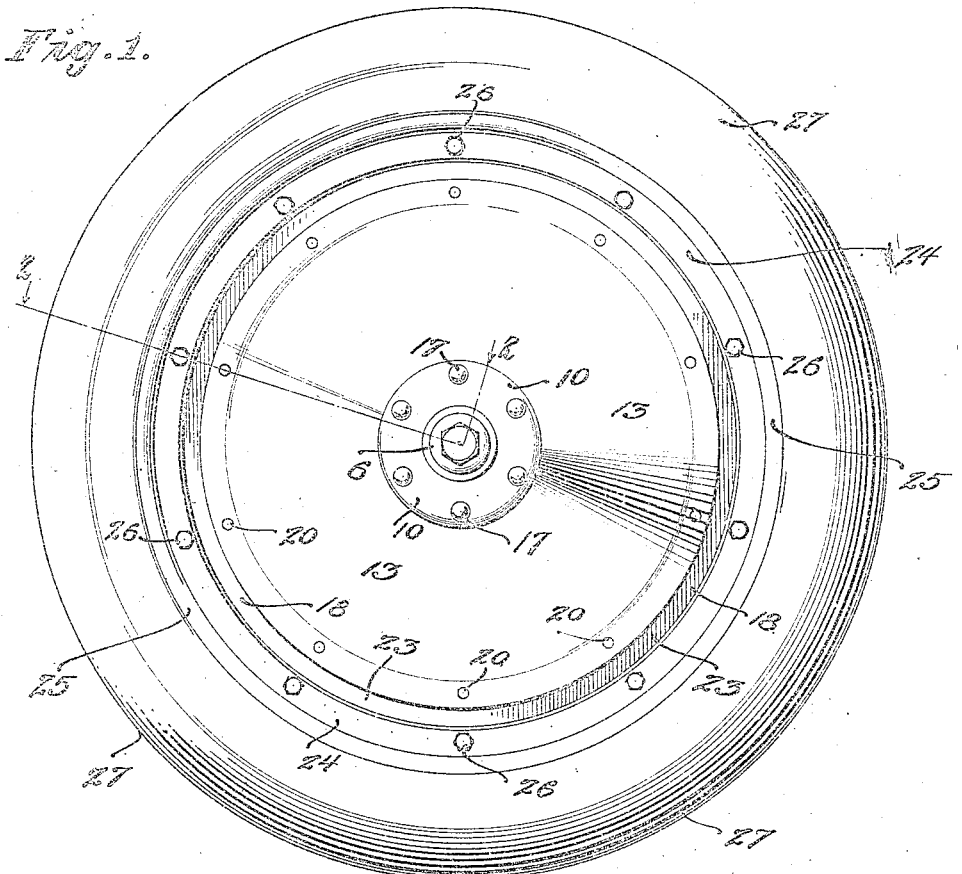
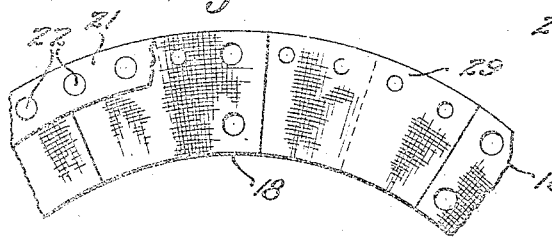
Inventor
Allen E. Hall

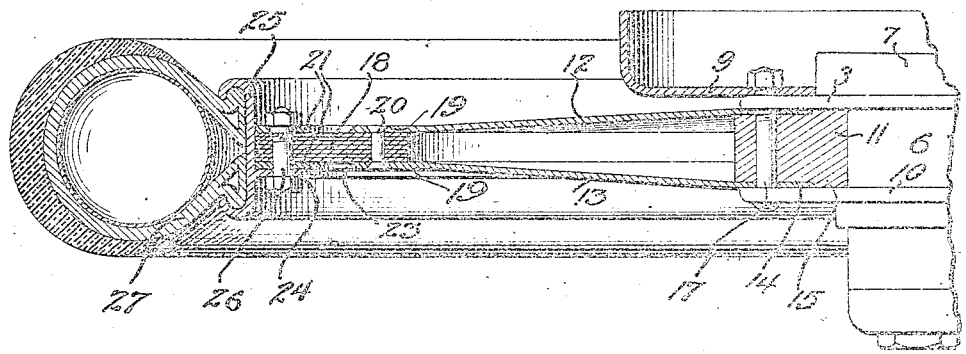
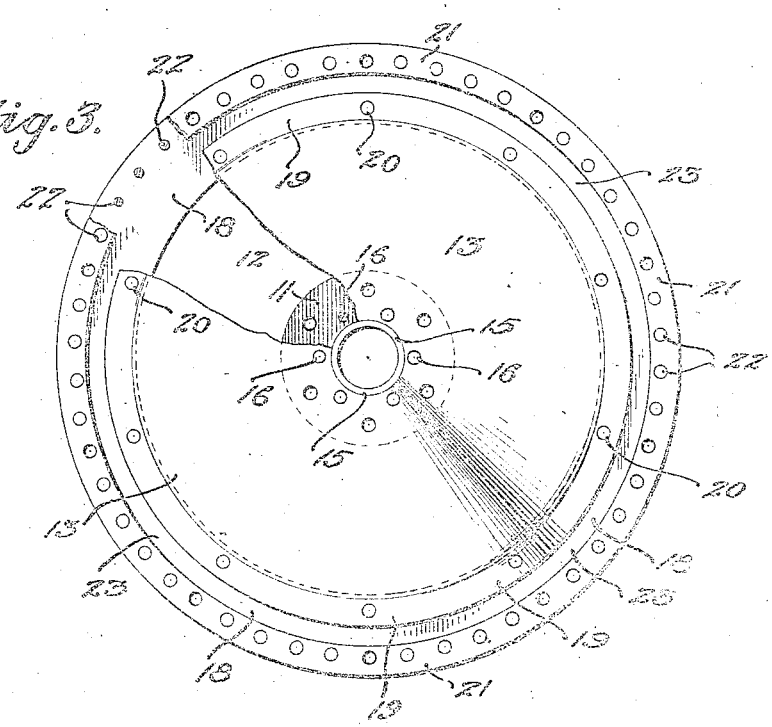

Patented Oct. 17, 1922.

1,432,690

UNITED STATES PATENT OFFICE.

ALLEN E. HALL, OF PHILADELPHIA, PENNSYLVANIA, ASSIGNOR TO HALL SYNDICATE, INC., A CORPORATION OF DELAWARE.

VEHICLE WHEEL.

Application filed October 9, 1920. Serial No. 415,812.

*To all whom it may concern:*

Be it known that I, ALLEN E. HALL, a citizen of the United States, residing at Philadelphia, in the county of Philadelphia and State of Pennsylvania, have invented certain new and useful Improvements in Vehicle Wheels, of which the following is a specification.

One object of my present invention is to provide an improved vehicle wheel which will be so constructed that it will include means interposed between the hub portion and the rim which will serve as shock-absorbing means so as to enable a vehicle to ride more easily over a roadway.

Another object is to make my improved wheel of such construction that it can be easily placed upon or taken off a vehicle and so that the parts may be easily manufactured and put together.

A still further object is to provide a durable wheel structure which can be made without the use of spokes so that the parts can be readily cleaned in the same manner as an ordinary disk wheel.

These objects and other advantageous ends which will be described hereinafter, I attain in the following manner, reference being had to the accompanying drawings in which Figure 1 is a side elevation of a wheel made in accordance with my present invention, Figure 2 is an enlarged fragmentary section taken on the line 2—2 of Figure 1, Figure 3 is a side elevation showing certain of the parts broken away and illustrating the arrangement of the more important parts of my invention, Figure 4 is a fragmentary view illustrating the arrangement of certain of the non-metallic elements and showing how the same can be put together to form a laminated ring structure, and Figure 5 is a fragmentary edge view of certain of the parts shown in Figure 4.

Referring to the drawings, 6 represents the hub of a wheel having a collar 7 provided with a flange 8 which may be attached to the brake drum 9 of a vehicle, such for example as an automobile. A flanged ring 10 on the hub 6 is spaced from the flange 8 of the collar 7 and between the flanged ring 10 and flange 8 is located a ring 11 which is preferably made of wood; said ring at the outer sides thereof having two metallic disks 12 and 13; the inner portions of said disks being located between the ring 11 and the respective flanges of the collar 7 and ring 10 as clearly shown in Figure 2; said ring 11 preferably being cut away as shown at 14 to make room for the disks 12 and 13 and also to permit a part 15 of the ring 11 to engage the collar 7 and ring 10. The disks 12 and 13 are preferably permanently secured to the ring 11 by rivets 16 as shown in Figure 3, and bolts 17 pass through the flanges of the ring 10 and collar 7 and also through the brake drum 9, disks 12 and 13 and ring 11 so that by removing the nuts of the bolts 17, the parts can readily be separated with the exception of the ring 11 from the disks 12 and 13. The disks 12 and 13 from the ring 11 slant toward each other and at their outer ends are riveted to a ring 18 of non-metallic material, such for example as fibrous material, canvas or fabric; said ring 18 being positioned between the edge portions 19 of the disks 12 and 13 as clearly shown in Figures 2 and 3, the rivets 20 extending through the edge portions 19 of the plate and the ring 18.

Two other rings 21 are secured to the ring 18 by rivets 22; said rings 21 being preferably made of metal and of larger internal diameter than the external diameters of the disks 12 and 13 so that there is a space 23 between the inner edges of the rings 21 and the outer edges of the disks 12 and 13. The rings 21 are secured in the present instance to an inwardly extending flange 24 of a rim 25 by bolts 26; said bolts extending through the flange 24, rings 21 and non-metallic ring 18. Any suitable tire, such as the tire 27, may be connected to the rim 25. It is thus obvious that the non-metallic ring 18 is interposed between the rim and the hub portion of the wheel and since this non-metallic ring 18 is the only means of connection between the rim and the disks 12 and 13, it will take the weight of the vehicle and since the ring 18 is made of fabric or fibrous non-metallic material, it will tend to absorb shocks due to the movement of the vehicle wheel over a roadway.

I preferably make the ring 18 of a laminated structure in which each lamination 28 consists of segmental pieces 29, as clearly shown in Figures 4 and 5; the pieces 29 of one lamination overlapping the parting between the pieces of adjacent laminations; the arrangements of the rivets and bolts preferably being such as to pass through the structure at points remote from the partings between the pieces 29 as clearly shown by the arrangement of holes for the rivets and bolts as shown in Figure 4. I thus secure a structure in which equal tension is present at all portions of the circumference of the ring 18 and furthermore I endeavor to so cut the pieces 29, when they are made of woven fabric that the warp extends substantially radial to the axis of the wheel or as near radial as it is possible to cut the material.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent:—

1. A wheel including hub and rim portions; a disk structure leading outwardly from the hub to a position approaching said rim; and a ring of non-metallic flexible material interposed between and in connection with said rim and disk structure; substantially as described.

2. A vehicle wheel including disks secured to the hub portion thereof; and a ring of non-metallic sheet material secured to said disks and to the rim of said wheel; substantially as described.

3. A vehicle wheel including disks secured to the hub portion thereof; a non-metallic ring having a portion secured to said disks; an outer ring secured to said non-metallic ring independently of said disks; and means for securing said outer ring to the rim; substantially as described.

4. A vehicle wheel including disks secured to the hub portion thereof; and a non-metallic ring secured to said disks and to the rim of said wheel, said non-metallic ring being made up of sheet material in laminated form and constituting the sole connection between the disks and the rim; substantially as described.

5. A vehicle wheel including disks secured to the hub portion thereof; and a non-metallic ring secured to said disks and to the rim of said wheel, said non-metallic ring being made up of a laminated structure of sheets of fabric, substantially as described.

6. A vehicle wheel including disks secured to the hub portion thereof; a non-metallic ring having a portion secured between said disks; and other rings secured to said non-metallic ring and to the rim, said other rings being of greater internal diameter than the external diameter of said disks whereby a space is provided between said second mentioned rings and the outer edges of said disks; substantially as described.

7. A vehicle wheel including disks secured to the hub portion thereof; a non-metallic ring having a portion secured between said disks; other rings secured to said non-metallic ring at opposite sides thereof and being independent of said disks; and means for securing said other rings to the rim; substantially as described.

8. A vehicle wheel including a ring of laminated sheet woven fabric interposed between the rim and hub portions thereof, said laminations being annular and being made up of sections in which certain of the woven threads extend approximately radial with respect to the axis of the wheel; substantially as described.

9. A vehicle wheel having annularly arranged means including woven material forming a connection between the rim and the hub portions, said means being located to act as a medium through which forces imposed upon the wheel are transmitted between the rim and the hub; substantially as described.

In testimony whereof I have signed my name to this specification in the presence of two subscribing witnesses.

ALLEN E. HALL.

Witnesses:
ELIZABETH GARBE,
CHAS. E. POTTS.